United States Patent
Coon (10) Patent No.: US 7,292,413 B1
(45) Date of Patent: *Nov. 6, 2007

(54) MICROACTUATED SUSPENSION WITH SHEAR TRANSMISSION OF FORCE

(75) Inventor: Warren Coon, Temecula, CA (US)

(73) Assignee: Magnecomp Corporation, Temecula, CA (US)

( * ) Notice: Subject to any disclaimer, the term of this patent is extended or adjusted under 35 U.S.C. 154(b) by 402 days.

This patent is subject to a terminal disclaimer.

(21) Appl. No.: 11/051,240

(22) Filed: Feb. 4, 2005

Related U.S. Application Data (63) Continuation-in-part of application No. 10/210,409, filed on Jul. 31, 2002, now Pat. No. 6,894,876.

(60) Provisional application No. 60/309,825, filed on Aug. 1, 2001.

(51) Int. Cl.
G11B 21/24 (2006.01)

(52) U.S. Cl. .................................................. 360/294.4

(58) Field of Classification Search ............. 360/294.6, 360/294.4
See application file for complete search history.

(56) References Cited

U.S. PATENT DOCUMENTS 6,031,317 A    2/2000   Chen

OTHER PUBLICATIONS

Koganezawa et al., Dual-Stage Actuator System for Magnetic Disc Drives Using a Shear Mode Piezoelectric Microactuator, Mar. 1999, IEEE Transactions on Magnetics, vol. 35, No. 2, 988-992.

*Primary Examiner*—A. J. Heinz
(74) *Attorney, Agent, or Firm*—Intellectual Property Law Office of Joel D. Voelzke (57) ABSTRACT

A disk drive suspension has a base portion, a spring portion, and a beam portion carrying a slider at a disk. The base portion is a laminate of two inextensible outer layers and an inner layer that is extensible in shear. Microactuators that expand or contract are attached by their opposite ends in angled or parallel relation to the respective outer layers to shift the outer layers relative to each other as a function of shearing in the inner layer to shift the slider at the disk.

38 Claims, 6 Drawing Sheets

MICROACTUATED SUSPENSION WITH SHEAR TRANSMISSION OF FORCE

RELATED APPLICATION

This application is a continuation in part of application Ser. No. 10/210,409 filed Jul. 31, 2002, now U.S. Pat. No. 6,894,876, which application claims the benefit of U.S. Provisional Application Ser. No. 60/309,825, filed Aug. 1, 2001.

STATEMENT REGARDING FEDERALLY SPONSORED RESEARCH OR DEVELOPMENT

Not Applicable

REFERENCE TO A MICROFICHE APPENDIX

Not Applicable

BACKGROUND OF THE INVENTION

1. Field of the Invention

This invention relates to disk drive suspensions, and more particularly to such suspensions having microactuated movement of the slider over a disk. In the invention the microactuator first and second, or proximal and distal, ends are attached respectively first and second outer layers of a laminate bonded to an inner layer that moves in shear to accommodate the relative movement of the outer layers. The outer layers are attached to or are part of the suspension base portion which in turn is connected to the suspension beam portion through an integral or separately formed spring portion. Shifting of the base portion outer layers across the inner layer pivots the beam and effects a microadjustment of the slider location.

2. Description of the Related Art

Microactuated suspensions are able to microadjust for better tracking on a disk. One or two microactuators are used coupled between the proximate, fixed and the distal, movable portions of a suspension to effect relative movement of these portions. The movement is achieved by bending one or both of the metal members that define the proximate and distal portions. The energy required to do this is a design limitation. The conventionally required reduction in metal thickness in the area of bending is a further design problem.

BRIEF SUMMARY OF THE INVENTION

With reduced size of suspensions and new materials, such as laminates, being used, e.g. as flexible circuits and as circuit supports, that do not lend themselves to conventional microactuation approaches, the invention adapts these new materials and combines them with microactuators to take advantage of their unique properties to better effect microactuation at lower cost of manufacture, and to minimize design compromises in the suspension parts.

It is an object, therefore, to provide a disk drive suspension using a laminate of first and second outer layers and an inner layer comprised of plastic such as polyimide. It is a further object to provide microactuation using as a typical laminate one comprised of a first outer layer of a metal such stainless steel about 0.0012 inch thick, although this can be varied for particular purposes, an inner layer of extensible material, such as a plastic like about 0.008 inch polyimide, and a second outer layer of metal such as stainless steel about 0.002 inch thick. The thickness of the inner and second out layers can also be varied as required for different effects. It is a further object to form a suspension member of a three layer laminate, using one outer layer as or connected to the proximate portion of the suspension, the other outer layer as or connected to the suspension distal portion, coupling, e.g. gluing microactuators to the two outer layers, and effecting relative movement between the outer layers by elongating or contracting the plastic inner layer, to cause micromovement between the first and second outer layers and thus the proximate and distal portions of the suspension and the slider carried by the distal portion. It is a further object to provide a new microadjustment system for microactuated suspensions. The relatively thick middle layer, combined with its low modulus of elasticity, means that the microactuating PZTs (piezoelectric crystals) can drive the motion in shear mode instead of bending mode.

These and other objects of the invention to become apparent hereinafter are realized in a microactuated disk drive suspension comprising a first outer layer, an inner layer, and a second outer layer laminate, and a dimensionally variable microactuator having first and second end regions and a middle region, the first and second outer layers mounting the microactuator by its first and second end regions respectively, whereby dimensional variations in the microactuator relatively shift the outer layers as a function of plastic inner layer movement in shear.

In a further embodiment, the invention provides a microactuated disk drive suspension comprising a base portion, a spring portion and a beam portion, the base portion comprising a laminate of first and second relatively inextensible outer layers and a plastic inner layer extensible in shear, and a dimensionally variable microactuator for positioning the beam portion, the microactuator having a first end region attached to the first outer layer and a second end region attached to the second outer layer, whereby dimensional variations in the microactuator relatively shift the first and second outer layers as a function of inner layer movement in shear in beam portion positioning relation.

In this and like embodiments, typically, the first and second outer layer comprise metal, the plastic material is a synthetic organic polymer, such as a synthetic organic polymer comprising repeating imide or acrylic moieties, at least one of the first and second outer layers comprises stainless steel, aluminum or copper, there is also included a second dimensionally variable microactuator for positioning the load beam cooperatively with the first microactuator, the second microactuator having a first end region attached to the first outer layer and a second end region attached to the second outer layer, whereby dimensional variations in the microactuators relatively shift the first and second outer layers as a function of inner layer movement in shear in beam portion positioning relation, the suspension is combined with a flexible circuit, the first outer layer has an outer surface and an inner surface, the second outer layer has an outer surface and inner surface, the microactuator first end being attached to the first outer layer outer surface and to the second outer layer inner surface for relative shifting of the first and second outer layers by the microactuator, the microactuator is disposed at an acute angle to the first and second outer layers, or the microactuator is substantially parallel to the first and second outer layers.

Further, typically, the first outer layer has an outer surface and an inner surface, the second outer layer has an outer surface and inner surface, the microactuator first end region being attached to the first outer layer outer surface and to the second outer layer inner surface for relative shifting of the first and second outer layers by the microactuator, the microactuator is disposed at an acute angle to the first and second outer layers, or the microactuator is substantially parallel to the first and second outer layers, the microactuator second end region is glued to the second outer layer inner surface, the glue having an extent sufficient to space the microactuator second end region from the second outer layer inner surface and maintain the microactuator substantially parallel with the first and second outer layers, or the microactuator second end region is glued to a locally deflected second outer layer portion, the layer portion being deflected toward the first outer layer sufficiently, to maintain the microactuator substantially parallel with the first and second outer layers.

In a further embodiment, the invention provides a microactuated disk drive suspension comprising a base portion, a spring portion and a beam portion, the spring portion being separately formed and attached to the base and beam portions, the base portion comprising a laminate of first and second relatively inextensible outer layers and a plastic inner layer extensible in shear, and a pair of dimensionally variable microactuators for positioning the beam portion, the microactuator having a first end region attached to the first outer layer and a second end region attached to the second outer layer, whereby dimensional variations in the microactuator relatively shift the first and second outer layers as a function of inner layer movement in shear in beam portion positioning relation.

In this and like embodiments, typically, the base portion first outer layer has left and right regions, a mid-region, and left and right gaps between the mid region and the left and right regions, the second outer layer has left, right and mid-regions and left and right gaps generally opposing the first outer layer regions and gaps, the inner layer connecting the first and second outer layer regions, the second outer layer extending proximately beyond the regions in laminate free relation, the second outer layer extending distally and discontinuously beyond the regions in laminate free relation and attached to the base portion by the spring portion to define the beam portion, one of the microactuators traversing each of the gaps and bonded to the first and second outer layers in layer relative shifting relation, there can be also included a stiffener for the distally extended second outer layer, a support for the proximally extended second outer layer, and also a transverse rib stiffening the base portion against bowing at the spring portion.

As in previous embodiments, in this embodiment the first outer layer has an outer surface and an inner surface, the second outer layer has an outer surface and inner surface, the microactuator first end region being attached to the first outer layer outer surface and the microactuator second end region being attached to the second outer layer inner surface for relative shifting of the first and second outer layers by the microactuator, and the microactuators can be arranged in angular or parallel orientation relative to the outer layers, or their common plane.

In a further embodiment, there is provided a microactuated disk drive suspension comprising a base portion, a spring portion and a beam portion, the base portion comprising a laminate of first and second relatively inextensible outer layers and a plastic inner layer extensible in shear, the spring portion comprising a laminate-free distal extension of the second outer layer, the beam portion comprising a further laminate-free distal extension of the second outer layer, and a pair of dimensionally variable microactuators for positioning the beam portion, the microactuator having a first end region attached to the first outer layer and a second end region attached to the second outer layer, whereby dimensional variations in the microactuator relatively shift the first and second outer layers as a function of inner layer movement in shear in beam portion positioning relation. In this and like embodiments the base portion first outer layer has left and right regions, a mid-region, and left and right gaps between the mid region and the left and right regions, the second outer layer has left, right and mid-regions and left and right gaps generally opposing the first outer layer regions and gaps, the inner layer connecting the first and second outer layer regions, one of the microactuators traversing each of the gaps and bonded to the first and second outer layers in layer relative shifting relation.

In this embodiment, as well, there can be further included a stiffener for the distally extended second outer layer, and where the second outer portion is proximally extended beyond the base, a support for the proximally extended second outer layer beyond the base can be provided.

In its method aspects, the invention provides a method of shifting a slider at a disk including carrying the slider on a suspension rigid portion, providing the rigid portion from a metal layer of a laminate having two metal layers and plastic layer therebetween having movement in response to shear forces, coupling the two metal layers together with a microactuator extending through the plane of the plastic layer, and oppositely driving the rigid portion metal layers responsive to movement in shear in the plastic film layer to shift the slider at the disk with the microactuator.

Further, in the invention method there is included a method of shifting a slider at a disk, including carrying the slider on a suspension beam portion attached to a spring portion and a base portion, providing the base portion from a laminate having two relatively inextensible outer layers and an inner plastic layer resistant to movement in shear, providing the beam portion from an outer layer of the laminate, attaching the two outer layers together with opposite ends of a microactuator, and oppositely driving the outer layers with the microactuator against the resistance to movement in shear in the plastic inner layer to shift the slider at the disk with the microactuator.

BRIEF DESCRIPTION OF THE SEVERAL VIEWS OF THE DRAWINGS

The invention will be further described in conjunction with the attached drawings in which.

DETAILED DESCRIPTION OF THE INVENTION

Modulus is the relationship of applied stress (force per area) to strain (movement per length). Low modulus means that small amounts of force on the outer layers are necessary to displace (stretch, shrink) the inner material. Shear mode means that the left and right sides of the suspension elongate or contract as required by distorting the inner plastic material in shear.

Figure 1:
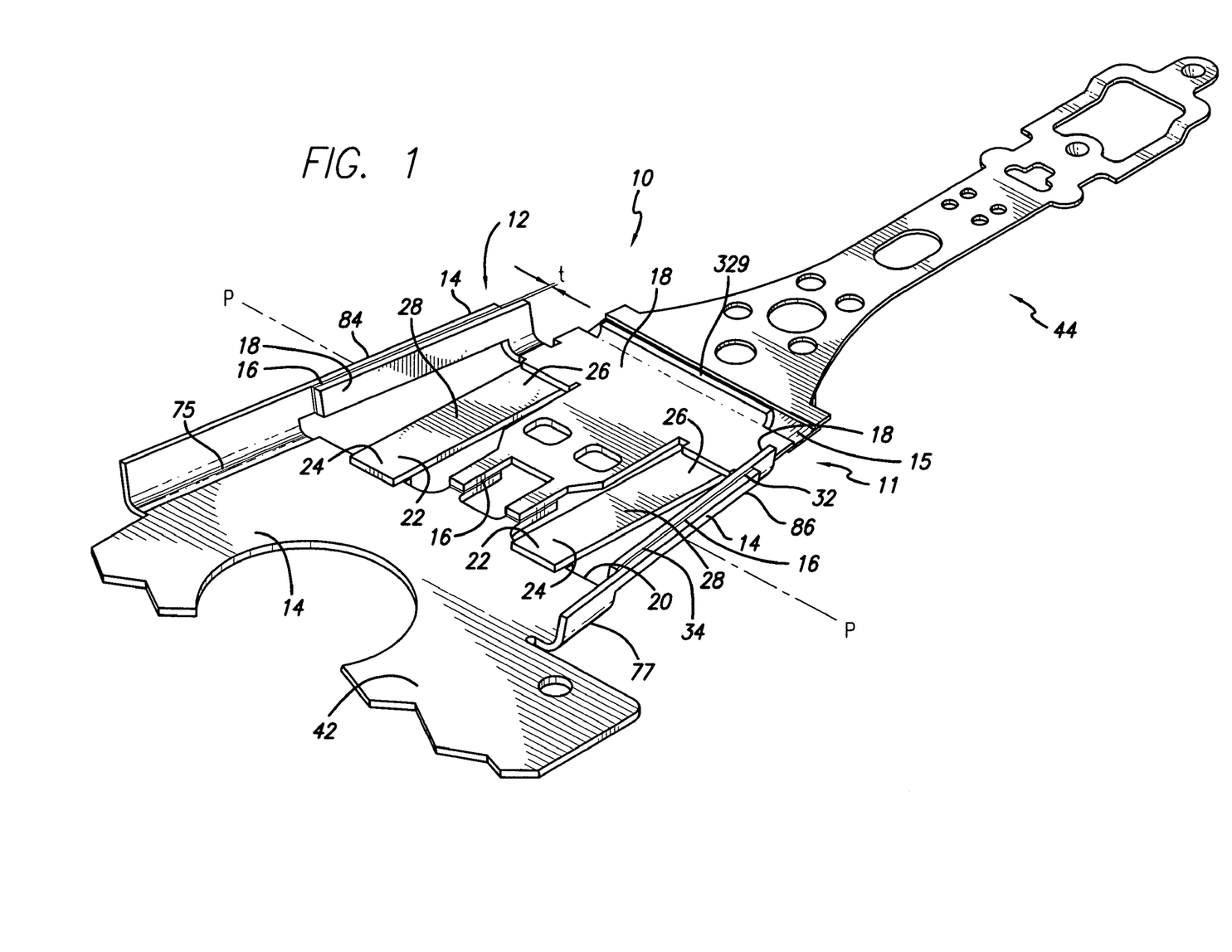
FIG. 1 is an oblique view of the invention suspension member.

With reference now to the drawings in detail, in FIG. 1 microactuated disk drive suspension 10 comprises a laminate 12 of a first outer layer 14, a middle plastic layer 16, and a second outer layer 18. Plastic layer 16 extends in a plane P. A dimensionally variable microactuator 22, attached to laminate 12 has first and second end regions 24, 26, respectively, and a middle region 28 extending through the plastic layer plane P. First and second outer layers 14, 18 mount the microactuator 22, comprising one or two microactuators, as shown, by first and second end regions 24, 26 respectively, so that dimensional variations in the microactuator relatively shift the outer layers as a function of plastic layer 16 movement in shear.

First and second outer layers 14, 18 typically comprise a metal, such as a conductive metal, e.g. stainless steel, aluminum or copper. The plastic layer 16 material is typically a synthetic organic polymer, such as one comprising repeating imide or acrylic moieties. Laminate 12 is apertured to pass the microactuator through the plastic layer plane P.

The plastic layer 16 has a first surface 32 fixed to the first metal layer 14 and a second surface 34 fixed to the second metal layer 18. Plastic layer 16 has a thickness t permitting relative movement between the first and second surfaces as a function of the movement of metal layers 14, 18 attached to those surfaces. The longitudinally dimensionally variable electrodynamic microactuator 22 is fixed at its first end region 24 to the first metal layer 14 and at its second end region 26 to the second metal layer 18 with its middle region 28 passing through the plastic layer 16. Microactuator 22 dimensional variations shift the first metal layer 14 relative to the second metal layer 18 as a function of relative movement within the plastic layer 16 between first and second metal layers.

Figure 2:
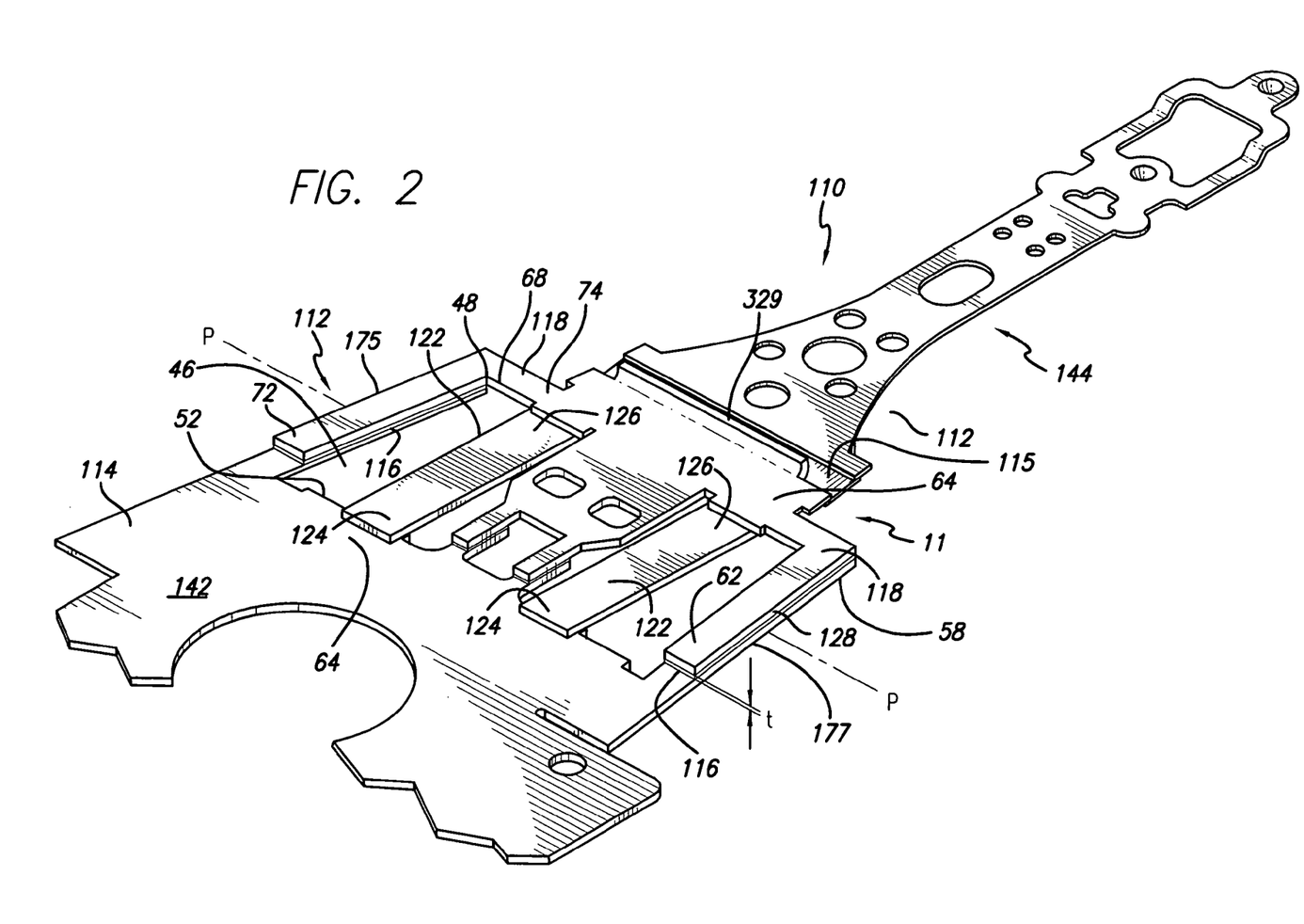
FIG. 2 is an oblique view of the invention suspension member in another embodiment.

With reference to FIG. 2, wherein like parts generally have like numerals plus 100, microactuated disk drive suspension member 110 has proximate and distal portions 142, 144, respectively, each comprising a laminate 112 of first and second substantially inextendable outer layers 114, 118, and a substantially extendable third inner layer 116 dimensionally responsive to shearing forces. Suspension member 110 has a generally rectangular aperture 46 with a distal edge margin 48 and spaced therefrom a proximate edge margin 52 in the first outer layer 114. Suspension member 110 further has distal edge margin 68 and proximate edge margin 72 in the second outer layer 118. First and second outer layers 114, 118 define on their respective distal and proximate edge margins 58, 62, 68, 72 oppositely facing attachment regions 64, 74. Microactuator structure 122 traverses the plane P of the inner layer 116, having first and second end regions 124, 126 fixed to respective first and second outer layer distal and proximate edge margins 58, 62, 68, 72 so as to act between the first and second outer layers 114, 118 with the third inner layer 116 response to shearing forces to shift the member distal portion 142 relative to the member proximate portion 144. Suspension member 110 is typically combined with microactuators 122, typically laterally spaced as shown, and a flexible circuit 82 (FIG. 3), hereinafter more particularly described.

FIG. 1 shows the metal layers 14, 18 bent at their left and right edge margins 74, 76 to form rails 84, 86. In this embodiment, the metal layers 14, 18 are etched or otherwise cut away in the proximate and distal portions 142, 144, so that the laminate 12 is left in the rails 84, 86, thus concentrating the shear forces in middle layer 16 resulting from opposite longitudinal movements in first and second outer layers 14, 18 under dimensional elongation or contraction of the microactuators 22.

In FIG. 2, the edge margins 175, 177 of metal layers 114, 118 are flat, not bent into rails, and adhered to one another by middle layer 116.

Figure 3:
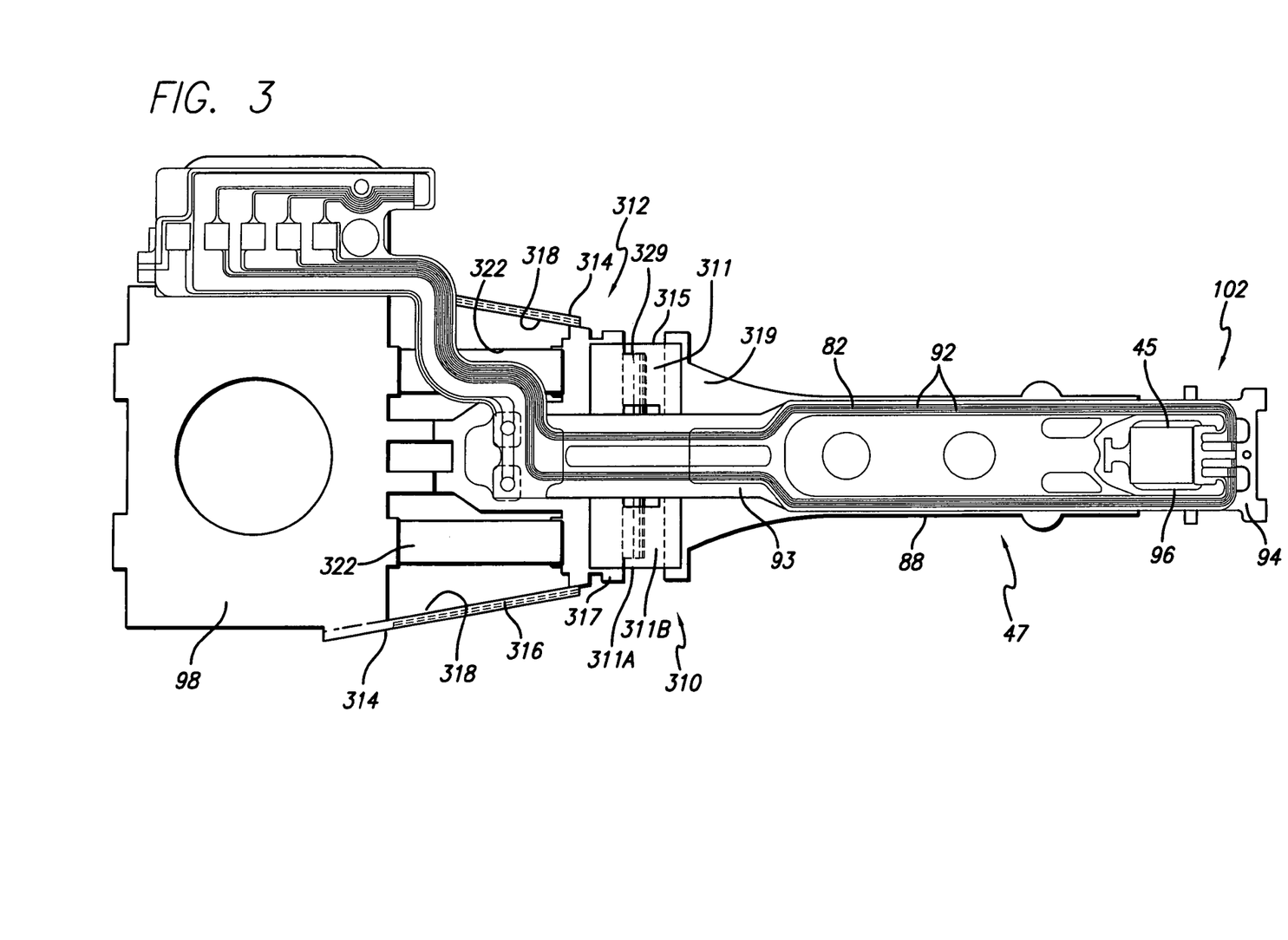
FIG. 3 is a plan view of the invention suspension in a further embodiment.

In FIG. 3, a further embodiment is shown in which like parts have like numbers plus 300. There, disk drive suspension 310 comprises a flexible circuit 82 comprising a laminate 88 of at least one pair of conductors 92, an insulative layer 93 of a plastic material or film, and a support layer 94 that defines a flexure 96. Elongated suspension member 310 supports the flexible circuit 82. Suspension member 310 has a proximal end 98 adapted to be mounted to an actuator (not shown) and a distal end 102 supporting the flexure 96 to carry a read/write head or slider 45 in operating proximity to a disk (not shown). Suspension member 310 comprises an assembly of juxtaposed first and second layers 314, 318 that are substantially inextendable by shear forces, at least one of the first and second layers being coupled to the distal end 102, and a third layer 316 between and attached to both the first and second layers. Third layer 316 is longitudinally variable in response to shear forces. An elongated microactuator 322 is arranged to relatively move the first and second layers 314, 318 in shear force imparting relation to the third layer 316 to relatively shift the first and second layers and thereby correspondingly shift the distal end 102 carried head relative to the disk.

In the FIG. 3 embodiment, suspension member 310 includes a spring portion 311 having a proximate part 311A and a distal part 311B. The member 310 second outer layer 318 has a proximate part 317 fixed to the proximate part 311A of the spring portion and a distal part 319 fixed to the distal part 311B of the spring portion 311, the second outer layer proximate part 317 acting on the second layer distal part 311B through the spring portion in response to relative movement of the first outer layer and the second outer layer across the third inner layer 316 effected by the microactuator 322. The suspension 310 includes as well flexible circuit laminate 82 of conductive traces 92, an insulative plastic material layer or film layer 93, and a metal support layer 94. Metal support layer 94 can define the spring portion 311. In this embodiment, and the embodiments of FIGS. 1 and 2, a transverse stiffening element 329 is formed in the first outer layer 314 against curling of the suspension member 310 adjacent the spring portion 311.

Figure 4:
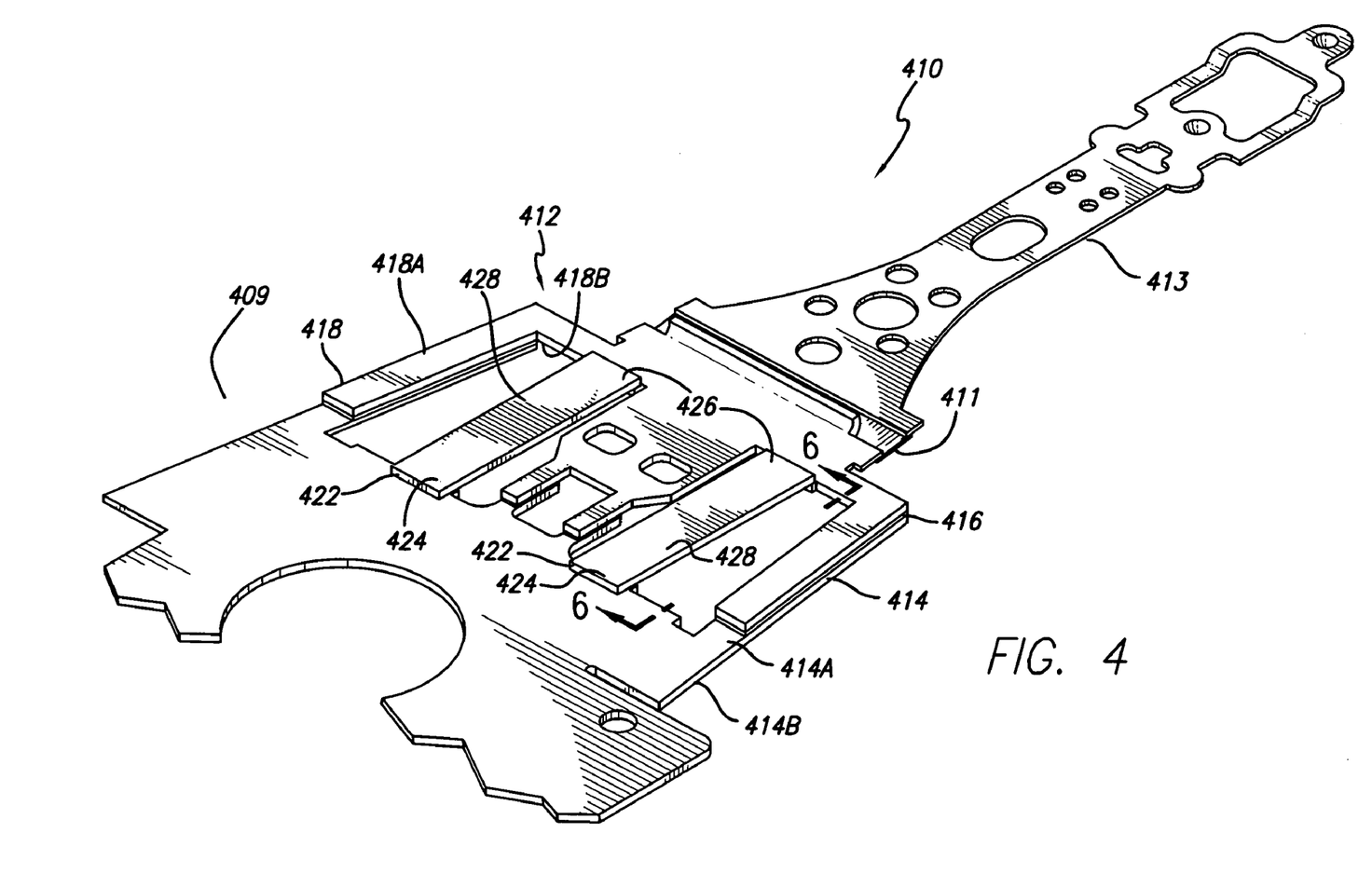
FIG. 4 is an oblique view of the invention suspension in a further embodiment.
Figure 6:
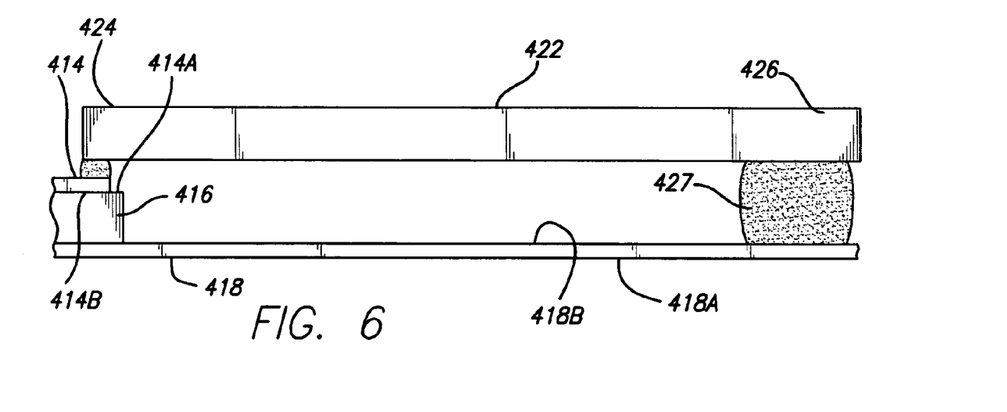
FIG. 6 is a view like FIG. 5, taken on line 6-6 in FIG. 4.

With reference to FIGS. 4 and 6, in which like parts to the previous embodiments generally have like numerals plus 400, microactuated disk drive suspension 410 comprises laminate 412 of a first outer layer 414, an inner layer 416, and a second outer layer 418, and a dimensionally variable microactuator 422 having first and second end regions 424, 426 and a middle region 428. First and second outer layers 414, 418 mount the microactuator 422 by its first and second end regions 424, 426 respectively so that dimensional variations in the microactuator relatively shift the outer layers as a function of plastic inner layer 416 movement in shear.

More particularly, suspension 410 comprises a base portion 409, a spring portion 411 and a beam portion 413. Base portion 409 comprises the laminate 412 of first and second relatively inextensible outer layers 414, 418 and the plastic inner layer 416 that is extensible in shear. The dimensionally variable microactuator structure 422 is arranged for positioning the beam portion 409. Microactuator 422 has its first end region 424 attached to the first outer layer 414 and its second end region 426 attached to the second outer layer 418 so that dimensional variations in the microactuator relatively shift the first and second outer layers as a function of inner layer movement in shear in beam portion positioning relation.

Typically, the first and second outer layers 414, 418 comprise metal, the inner layer 416 plastic material is a synthetic organic polymer, such as a synthetic organic polymer comprising repeating imide or acrylic moieties, at least one of the first and second outer layers comprises stainless steel, aluminum or copper. A second dimensionally variable microactuator 422 is generally provided to position the load beam portion 413 cooperatively with the first microactuator 422. Second microactuator 422 has its first end region 424 attached to the first outer layer 414 and a second end region 426 attached to the second outer layer 418, whereby dimensional variations in the microactuators relatively shift the first and second outer layers as a function of inner layer 416 movement in shear in beam portion positioning relation. Generally, the suspension 410 is combined with a flexible circuit; cf. 82 in FIG. 3. Also, the first outer layer 414 has an outer surface 414A and an inner surface 414B, the second outer layer 418 has an outer surface 418A and inner surface 418B.

Figure 5:
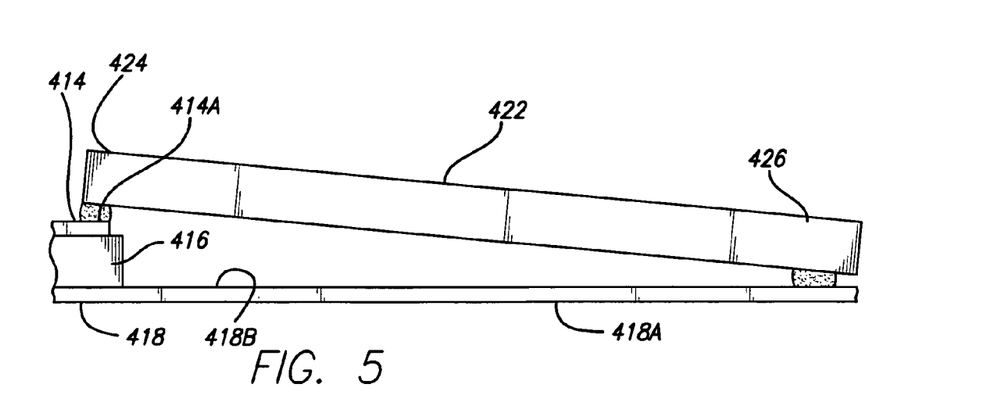
FIG. 5 is a fragmentary view in side elevation of the microactuator mounting portion of the invention suspension in a further embodiment.
Figure 7:
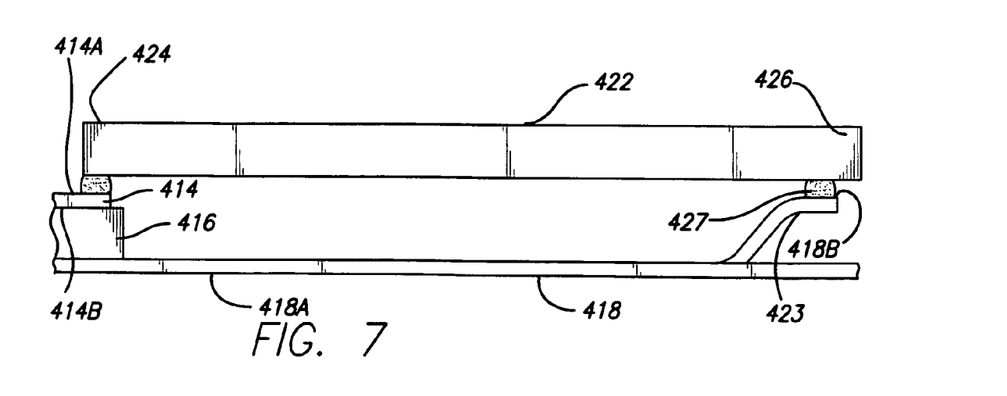
FIG. 7 is a fragmentary view in side elevation of the microactuator mounting portion of the invention suspension shown in a further embodiment; and, FIG. 8 is an oblique view of the invention suspension in another embodiment.

The microactuator 422 first end region 424 is attached to the first outer layer outer surface 414A and to the second outer layer inner surface 418B for relative shifting of the first and second outer layers by the microactuator. The microactuator(s) 422 can be disposed at an acute angle to the first and second outer layers 414, 418, that is to the plane of said layers, See FIG. 5, or the microactuator(s) can be substantially parallel to the first and second outer layers, as shown in FIGS. 6 and 7.

Preferably, the microactuator 422 is disposed at an acute angle to the first and second outer layers 414, 418, or the microactuator is substantially parallel to the first and second outer layers or the plane that includes such layers. In either case, preferably, the microactuator first end region 424 is glued or otherwise fixed to the first outer layer outer surface 414A and the microactuator second end region 426 is glued or otherwise fixed to the second outer layer inner surface 418B. Glue 427 has an extent normal to the planes of the outer layers 414, 418 that is sufficient to space the microactuator second end region 426 from the second outer layer inner surface 414B (while providing a bond) and maintain the microactuator 422 substantially parallel with the first and second outer layers 414, 418. Alternatively, in an embodiment that does not use a large quantity of glue 427, and with reference particularly to FIG. 7, the microactuator second end region is glued or otherwise fixed to a locally deflected portion 423 of second outer layer 418. Layer portion 423, as shown, is a central part of second outer layer 418 that is deflected toward the first outer layer 414 sufficiently to maintain the microactuator 422 substantially parallel with the first and second outer layers 414, 418 or their plane. In this embodiment, glue 427 height is reduced.

Figure 8:
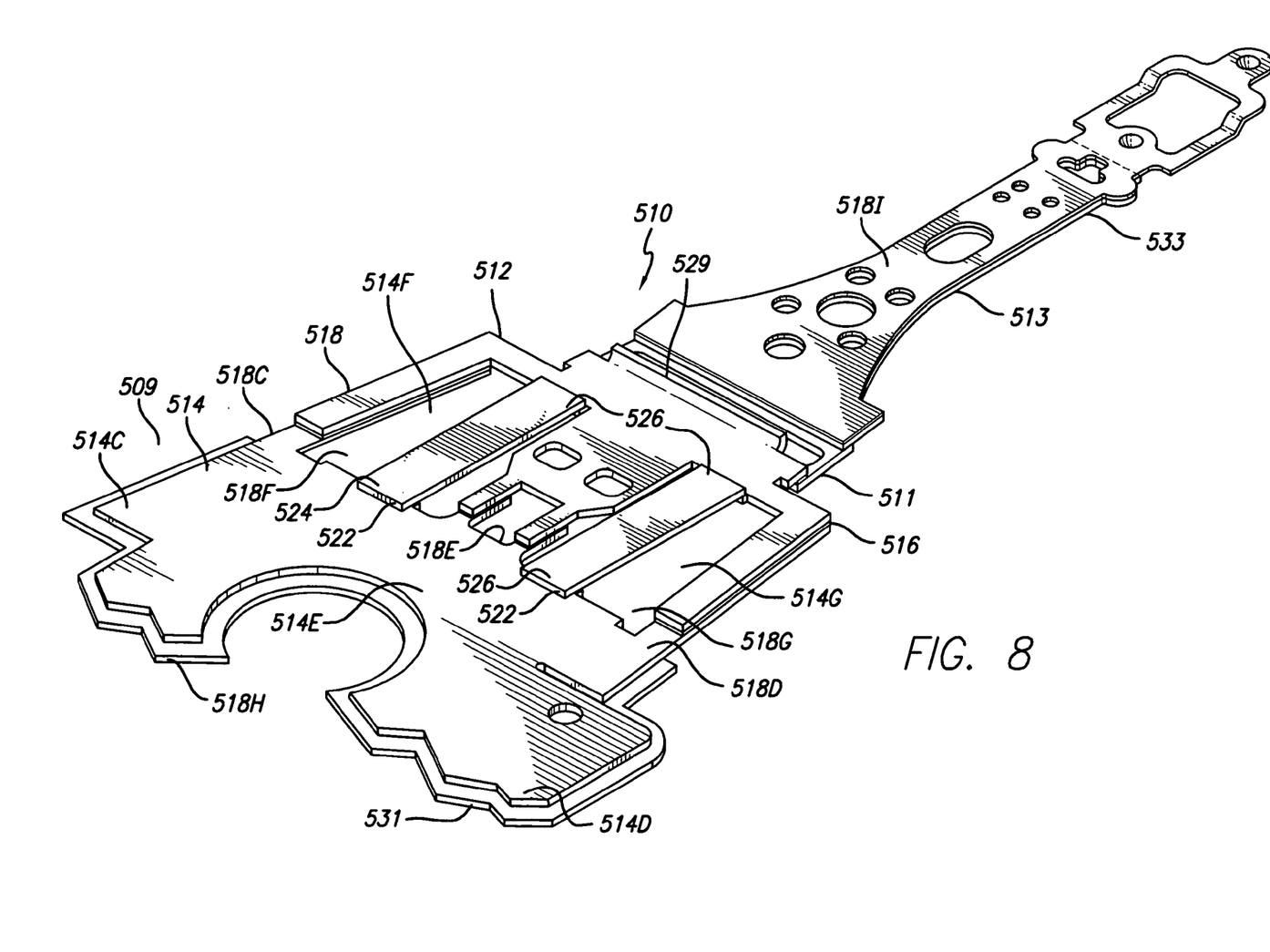

With reference to FIG. 8, in which like parts to other Figures generally bear like numerals plus 500, microactuated disk drive suspension 510 comprises a base portion 509, a spring portion 511 and a beam portion 513. It will be noted that the spring portion 511 is separately formed and attached to the base and beam portions 509, 513. Base portion 509 comprises a laminate 512 of first and second relatively inextensible outer layers 514, 518 and a plastic inner layer 516 extensible in shear, and a pair of dimensionally variable microactuators 522 for positioning the beam portion 513. Each microactuator 522 has a first end region 524 attached to the first outer layer 514 and a second end region 526 attached to the second outer layer 518 (see, e.g. FIGS. 6 and 7), whereby dimensional variations in the microactuators relatively shift the first and second outer layers as a function of inner layer movement in shear in beam portion positioning relation.

Base portion first outer layer 514 has left and right regions 514C and 514D, a mid-region 514E, and left and right gaps 514F and 514G between the mid region and the left and right regions. The second outer layer 518 has left, right and mid-regions 518C, 518D and 518E, respectively, and left and right gaps 518F and 518G that generally oppose the first outer layer regions and gaps 514C-G. Base portion inner layer 516 connects the first and second outer layer regions 514C-E, 518C-E, with the second outer layer 518 extending proximately beyond the regions 518C-E in laminate free relation at 518H. Second outer layer 518 also extends discontinuously and distally as 518I beyond the regions 518C-E in laminate free relation and is attached to the base portion 509 by the spring portion 511 to define the beam portion 513. One of the microactuators 522 traverses each of the gaps 514G,F and 518G,F and is bonded to the first and second outer layers 514, 518, as previously described, in layers 514, 518 relative shifting relation.

The suspension 510 further includes a stiffener 533 for the distally extended second outer layer 518I, a support 531 for the proximally extended second outer layer 518H beyond base 509, and also a transverse rib 529 stiffening the base portion 509 against bowing at the spring portion 511.

In its method aspects, the invention provides a method of shifting a slider 45 at a disk including carrying the slider on a suspension rigid portion 47, providing the rigid portion from a metal layer 18 of a laminate 12 having two metal layers 14, 18 and plastic layer 16 therebetween having movement in response to shear forces, coupling the two metal layers together with a microactuator 22, and oppositely driving the rigid portion metal layers 14, 18 responsive to movement in shear in the plastic film layer to shift the slider at the disk with the microactuator.

And, more particularly, with further reference primarily to FIG. 8, the invention method includes shifting a slider 45 (FIG. 3) at a disk, including carrying the slider on a suspension beam portion 513 attached to a spring portion 511 and a base portion 509, providing the base portion from a laminate 512 having two relatively inextensible outer layers 514, 518 and an inner plastic layer 516 resistant to movement in shear, providing the beam portion 513 from an outer layer 518 of the laminate, attaching the two outer layers 514, 518 together with opposite ends 524, 526 of a microactuator 522, and oppositely driving the outer layers with the microactuator against the resistance to movement in shear in the plastic inner layer to shift the slider at the disk with the microactuator.

The invention thus provides a disk drive suspension using a laminate of first and second outer layers and an inner layer comprised of plastic such as polyimide to provide microactuation using as a typical laminate one comprised of a first outer layer of a metal such stainless steel about 0.0012 inch thick, an inner layer of extensible material, such as a plastic, e.g. about 0.008 inch polyimide, and a second outer layer of metal such as stainless steel about 0.002 inch thick. A suspension member is formed of this three layer laminate, using one outer layer as or connected to the proximate portion of the suspension, the other outer layer as or connected to the suspension distal portion, coupling, e.g. gluing microactuators to the two outer layers, and effecting relative movement between the outer layers by elongating or contracting the plastic inner layer, to cause micromovement between the first and second outer layers and thus the proximate and distal portions of the suspension, and thereby movement of the slider carried by the distal portion using the relatively thick middle layer, combined with its low modulus of elasticity to have the microactuating PZTs drive the motion in shear mode instead of bending mode.

The foregoing objects are thus met.

I claim:

1. A microactuated disk drive suspension comprising a base portion, a spring portion and a beam portion, said base portion comprising a laminate of first and second relatively inextensible outer layers and a inner layer extensible in shear, and a dimensionally variable microactuator for positioning said beam portion, said microactuator having a first end region attached to said first outer layer and a second end region attached to said second outer layer, whereby dimensional variations in said microactuator relatively shift said first and second outer layers as a function of inner layer movement in shear in beam portion positioning relation.

2. The microactuated disk drive suspension according to claim 1, in which said first and second outer layer comprise metal.

3. The microactuated disk drive suspension according to claim 1, in which said material is a synthetic organic polymer.

4. The microactuated disk drive suspension according to claim 3, in which said synthetic organic polymer comprises repeating imide or acrylic moieties.

5. The microactuated disk drive suspension according to claim 1, in which at least one of said first and second outer layers comprises stainless steel, aluminum or copper.

6. The microactuated disk drive suspension according to claim 1, including also a second dimensionally variable microactuator for positioning said load beam cooperatively with said first microactuator, said second microactuator having a first end region attached to said first outer layer and a second end region attached to said second outer layer, whereby dimensional variations in said microactuators relatively shift said first and second outer layers as a function of inner layer movement in shear in beam portion positioning relation.

7. The microactuated disk drive suspension according to claim 6, in combination with a flexible circuit.

8. The microactuated disk drive suspension according to claim 7, in which said first outer layer has an outer surface and an inner surface, said second outer layer has an outer surface and inner surface, said microactuator first end region being attached to said first outer layer outer surface and said microactuator second end region being attached to said second outer layer inner surface for relative shifting of said first and second outer layers by said microactuator.

9. The microactuated disk drive suspension according to claim 8, in which said microactuator is disposed at an acute angle to said first and second outer layers.

10. The microactuated disk drive suspension according to claim 8 in which said microactuator is substantially parallel to said first and second outer layers.

11. The microactuated disk drive suspension according to claim 1, in which said first outer layer has an outer surface and an inner surface, said second outer layer has an outer surface and inner surface, said microactuator first end region being attached to said first outer layer outer surface and said second end region being attached to said second outer layer inner surface for relative shifting of said first and second outer layers by said microactuator.

12. The microactuated disk drive suspension according to claim 11, in which said microactuator is disposed at an acute angle to said first and second outer layers.

13. The microactuated disk drive suspension according to claim 11 in which said microactuator is substantially parallel to said first and second outer layers.

14. The microactuated disk drive suspension according to claim 13, in which said microactuator second end region is glued to said second outer layer inner surface, said glue having an extent sufficient to space said microactuator second end region from said second outer layer inner surface and maintain said microactuator substantially parallel with said first and second outer layers.

15. The microactuated disk rive suspension according to claim 13, in which said microactuator second end region is glued to a locally deflected second outer layer portion, said layer portion being deflected toward said first outer layer sufficiently to maintain said microactuator substantially parallel with said first and second outer layers.

16. A microactuated disk drive suspension comprising a base portion, a spring portion and a beam portion, said spring portion being separately formed and attached to said base and beam portions, said base portion comprising a laminate of first and second relatively inextensible outer layers and a inner layer extensible in shear, and a pair of dimensionally variable microactuators for positioning said beam portion, said microactuator having a first end region attached to said first outer layer and a second end region attached to said second outer layer, whereby dimensional variations in said microactuator relatively shift said first and second outer layers as a function of inner layer movement in shear in beam portion positioning relation.

17. The microactuated disk drive suspension according to claim 16, in which said base portion first outer layer has left and right regions, a mid-region, and left and right gaps between said mid region and said left and right regions, said second outer layer has left, right and mid-regions and left and right gaps generally opposing said first outer layer regions and gaps, said inner layer connecting said first and second outer layer regions, said second outer layer extending proximately beyond said regions in laminate free relation, said second outer layer extending distally beyond said regions in laminate free relation and attached to said base portion by said spring portion to define said beam portion, one of said microactuators traversing each of said gaps and bonded to said first and second outer layers in outer layer relative shifting relation.

18. The microactuated disk drive suspension according to claim 17, including also a stiffener for said distally extended second outer layer.

19. The microactuated disk drive suspension according to claim 17, including also a support for said proximally extended second outer layer.

20. The microactuated disk drive suspension according to claim 16, including also a transverse rib stiffening said base portion against bowing at said spring portion.

21. The microactuated disk drive suspension according to claim 17, in which said first and second outer layer comprise metal.

22. The microactuated disk drive suspension according to claim 17, in which said material is a synthetic organic polymer.

23. The microactuated disk drive suspension according to claim 22, in which said synthetic organic polymer comprises repeating imide or acrylic moieties.

24. The microactuated disk drive suspension according to claim 17, in which at least one of said first and second outer layers comprises stainless steel, aluminum or copper.

25. The microactuated disk drive suspension according to claim 16, in combination with a flexible circuit.

26. The microactuated disk drive suspension according to claim 25, in which said first outer layer has an outer surface and an inner surface, said second outer layer has an outer surface and inner surface, said microactuator first end region being attached to said first outer layer outer surface and said microactuator second end region being attached to said second outer layer inner surface for relative shifting of said first and second outer layers by said microactuator.

27. The microactuated disk drive suspension according to claim 26, in which said microactuator is disposed at an acute angle to said first and second outer layers.

28. The microactuated disk drive suspension according to claim 26, in which said microactuator is substantially parallel to said first and second outer layers.

29. The microactuated disk drive suspension according to claim 16, in which said first outer layer has an outer surface and an inner surface, said second outer layer has an outer surface and inner surface, said microactuator first end region being attached to said first outer layer outer surface and said microactuator second end region being attached to said second outer layer inner surface for relative shifting of said first and second outer layers by said microactuator.

30. The microactuated disk drive suspension according to claim 29, in which said microactuator is disposed at an acute angle to said first and second outer layers.

31. The microactuated disk drive suspension according to claim 29 in which said microactuator is substantially parallel to said first and second outer layers.

32. The microactuated disk drive suspension according to claim 31, in which said microactuator second end is glued to said second outer layer inner surface, said glue having an extent sufficient to space said microactuator second end from said second outer layer inner surface and maintain said microactuator substantially parallel with said first and second outer layers.

33. The microactuated disk drive suspension according to claim 31, in which said microactuator second end is glued to a locally deflected second outer layer portion, said layer portion being deflected toward said first outer layer sufficiently to maintain said microactuator substantially parallel with said first and second outer layers.

34. A microactuated disk drive suspension comprising a base portion a spring portion and a beam portion, said base portion comprising a laminate of first and second relatively inextensible outer layers and a plastic inner layer extensible in shear, said spring portion comprising a laminate-free distal extension of said second outer layer, said beam portion comprising a further laminate-free distal extension of said second outer layer, and a pair of dimensionally variable microactuators for positioning said beam portion, said microactuator having a first end region attached to said first outer layer and a second end region attached to said second outer layer, whereby dimensional variations in said microactuator relatively shift said first and second outer layers as a function of inner layer movement in shear in beam portion positioning relation.

35. The microactuated disk drive suspension according to claim 34, in which said base portion first outer layer has left and right regions, a mid-region, and left and right gaps between said mid region and said left and right regions, said second outer layer has left, right and mid-regions and left and right gaps generally opposing said first outer layer regions and gaps, said inner layer connecting said first and second outer layer regions, one of said microactuators traversing each of said gaps and bonded to said first and second outer layers in layer relative shifting relation.

36. The microactuated disk drive suspension according to claim 35, including also a stiffener for said distally extended second outer layer.

37. The microactuated disk drive suspension according to claim 35, in which said second outer portion is proximally extended beyond said base, and including also a support for said proximally extended second outer layer beyond said base.

38. A method of shifting a slider at a disk, including carrying said slider on a suspension beam portion attached to a spring portion and a base portion, providing said base portion from a laminate having two relatively inextensible outer layers and an inner layer extensible in shear, providing said beam portion from an outer layer of said laminate, attaching said two outer layers together with opposite ends of a microactuator, and oppositely driving said outer layers in shear with said microactuator to shift said slider at said disk with said microactuator.

* * * * *

UNITED STATES PATENT AND TRADEMARK OFFICE
CERTIFICATE OF CORRECTION

PATENT NO. : 7,292,413 B1  Page 1 of 1
APPLICATION NO. : 11/051240
DATED : November 6, 2007
INVENTOR(S) : Warren Coon It is certified that error appears in the above-identified patent and that said Letters Patent is hereby corrected as shown below:

At Claim 34, Column 12, Line 2, delete "plastic".

Signed and Sealed this

Twenty-fifth Day of December, 2007

JON W. DUDAS
*Director of the United States Patent and Trademark Office*